UNITED STATES PATENT OFFICE.

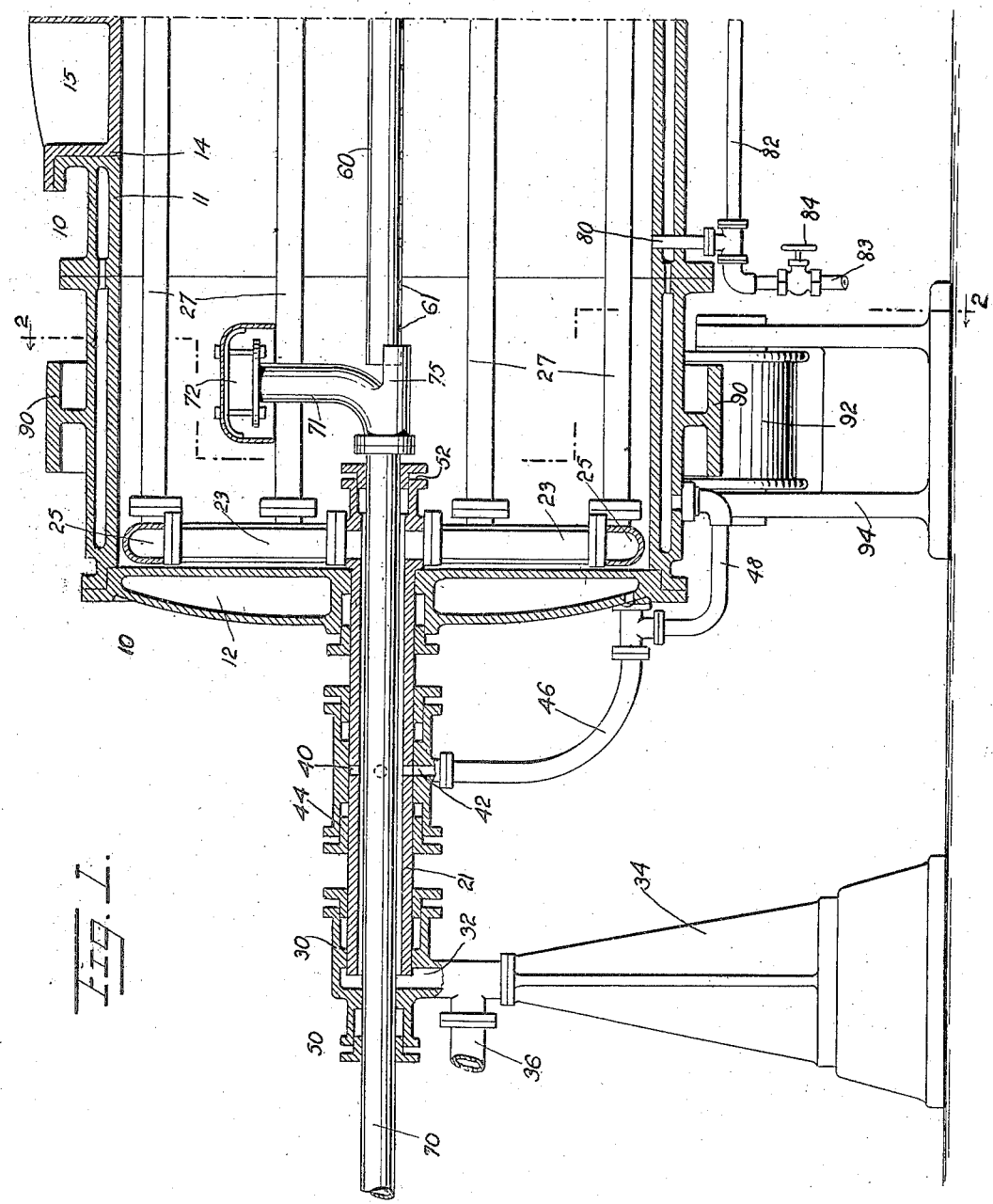

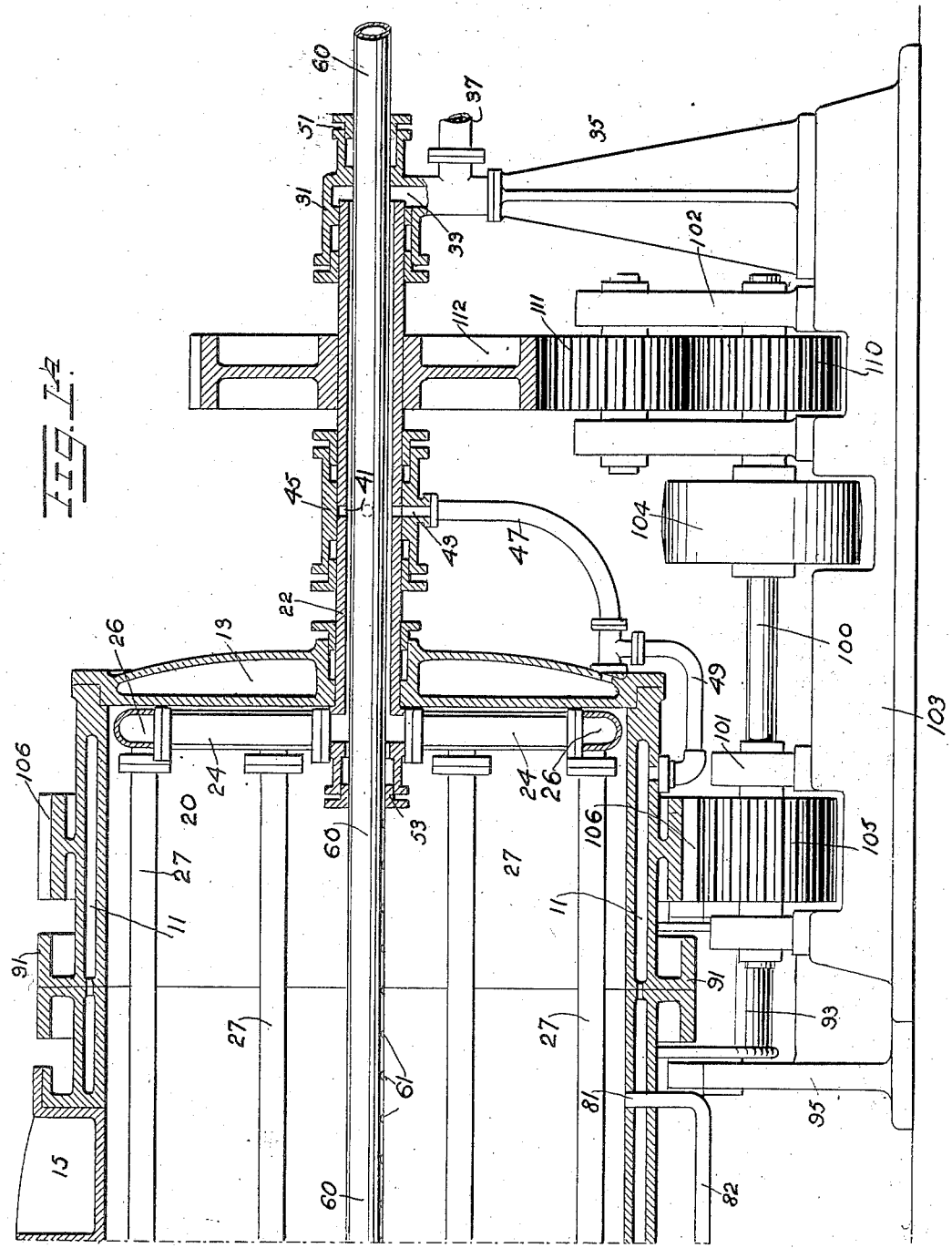

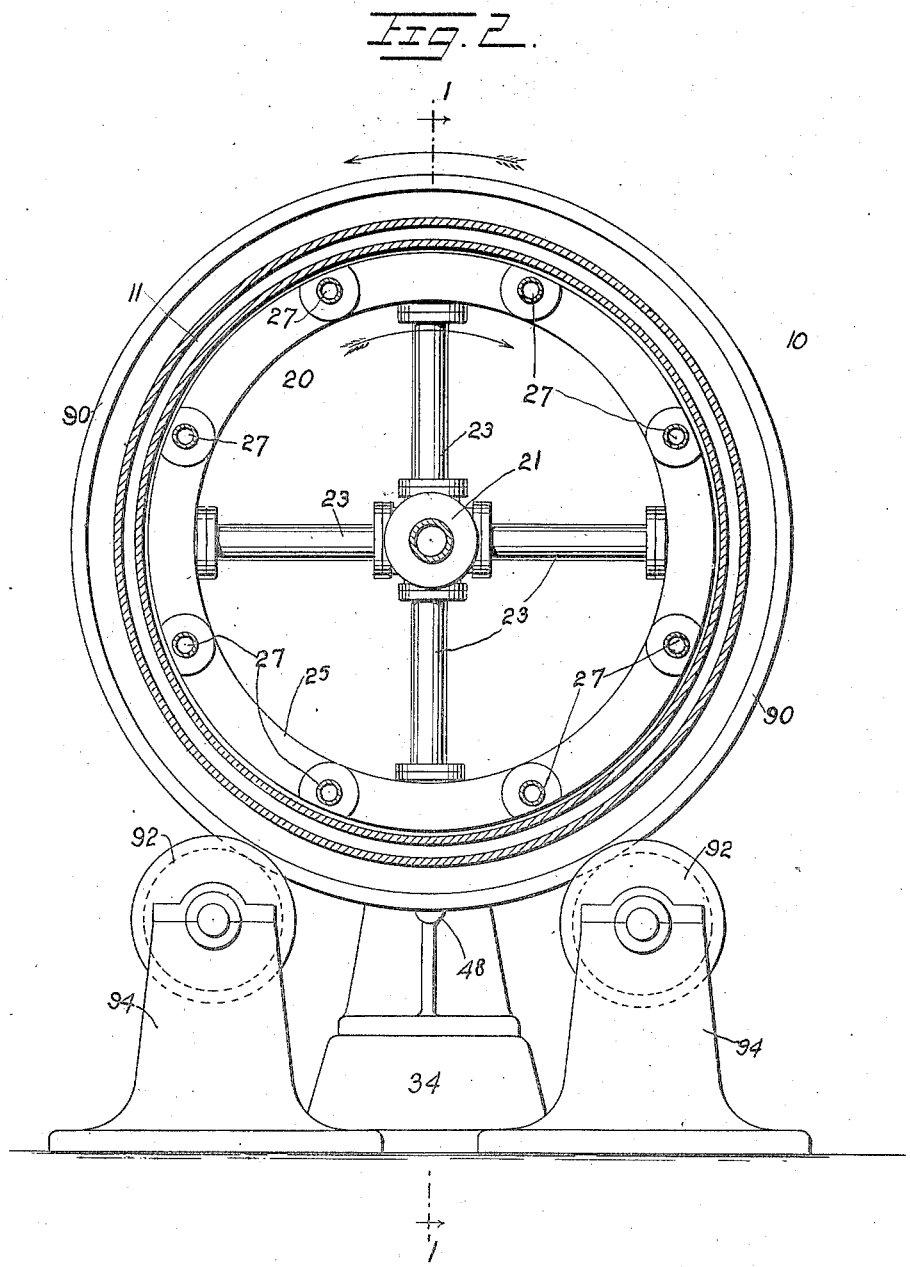

KARL A. STAHLGREN AND THOMAS L. SHANNON, OF NEWPORT, RHODE ISLAND.

APPARATUS FOR EXTRACTING GREASE FROM ORGANIC MATTER.

1,341,523.   Specification of Letters Patent.   Patented May 25, 1920.

Application filed March 11, 1919. Serial No. 282,036.

*To all whom it may concern:*

Be it known that we, KARL A. STAHLGREN and THOMAS L. SHANNON, both citizens of the United States, and residents of Newport, in the county of Newport and State of Rhode Island, have invented a new and Improved Apparatus for Extracting Grease from Organic Matter, of which the following is a full, clear, and exact description.

The object of the invention is to provide a new and improved apparatus for extracting grease from garbage and other organic matter in an exceedingly simple, thorough and economical manner. Another object is to provide a large heating surface for effectively heating the organic matter and at the same time insuring a thorough agitation of the organic matter and the solvent used to reduce the time of drying the organic matter and extracting the grease. Another object is to provide an apparatus which is exceedingly simple and durable in construction and not liable easily to get out of order.

With these and other objects in view the invention consists of certain novel features of construction as hereinafter shown and described and then specifically pointed out in the claims.

A practical embodiment of the invention is represented in the accompanying drawings forming a part of this specification, in which similar characters of reference indicate corresponding parts in all the views.

Figure 1 and Fig. 1ª represent a longitudinal central section of the apparatus for extracting grease from organic matter, the section being on the line 1—1 of Fig. 2; and Fig. 2 is a transverse section of the same on the line 2—2 of Fig. 1.

The garbage or other organic matter to be treated is placed in a revoluble drum 10 provided with a hollow rim 11 and hollow heads 12 and 13, and the rim 11 is provided with a suitable filling opening 14 through which the organic matter is placed in the drum, the opening 14 being normally closed by a suitable cap 15. Within the drum 10 is arranged a revoluble agitator comprising hubs 21 and 22 extending through the heads 12 and 13 and forming a bearing for the same to allow of rotating the drum in one direction and the agitator in an opposite direction. From the inner ends of the hubs 21 and 22 extend radial pipes 23, 24 terminating in ring-shaped or annular chambers 25, 26 connected with each other by longitudinally extending agitating and heating pipes 27. The outer ends of the hubs 21 and 22 are journaled in bearings 30 and 31 provided with steam chambers 32 and 33 and supported on suitable pedestals 34, 35. The steam chambers 32 and 33 are connected by pipes 36 and 37 with a steam boiler or other suitable source of steam supply or other heating medium to permit such heating medium to pass into the chambers 32 and 33 and from the latter by way of the hollow hubs 21 and 22 into the pipes 23 and 24, the annular steam chambers 25, 26 and the connecting pipes 27 to properly heat the agitator.

The hollow rim 11 and the heads 12 and 13 are supplied with steam for heating the drum and the steam is received from the hubs 21 and 22 and for this purpose the following arrangement is made: The hubs 21 and 22 are provided with ports 40 and 41 adapted to register with openings 42 and 43 formed in heads 44 and 45 mounted to rotate on the hubs 21 and 22. The heads 44 and 45 are provided with pipes 46 and 47 in register with the openings 42, 43, and the pipes 46 and 47 connect with the hollow heads 12 and 13 and are provided with branch pipes 48, 49 connected with the hollow rim 11 to supply the said hollow heads 12 and 13 and the rim 11 with steam to heat the drum.

The outer ends of the bearings 30 and 31 are provided with stuffing boxes 50 and 51 and similar stuffing boxes 52 and 53 are arranged on the inner ends of the hubs 21 and 22. Through the stuffing boxes 51 and 53 extends a stationary solvent supply pipe 60 passing through the hub 22 but spaced from the same to leave a passage for the steam used for heating the drum rim 11, its heads 12 and 13 as well as the agitator within the drum, as previously explained. The outer end of the pipe 60 is connected with a tank filled with gasolene or other solvent used at the time and the inner end of the pipe 60 is provided at its bottom with perforations 61 for discharging the solvent into the drum practically throughout the length thereof. Through the stuffing boxes 50 and 52 extends a stationary vapor outlet pipe 70 also extending through the hub 21 but spaced from the same to allow steam to pass through the agitator and the drum as previously explained. The inner end of the discharge pipe 70 is provided with an upwardly extending branch pipe 71 supporting a hood 72 to prevent the organic matter from clogging up the entrance to the branch pipe 71. It is understood that any gases arising from the reduction of the organic matter and the solvent used can readily pass out of the drum by way of the branch pipe 71 and the pipe 70 to a suitable place of discharge. The branch pipe 71 is provided with a support 75 for the inner end of the solvent supply pipe 60.

The rim 11 of the drum 10 is provided with drain pipes 80 and 81 connected with each other by a pipe 82 terminating in a discharge pipe 83 provided with a suitable valve 84 normally closed. When the operation of reducing the organic matter is completed and the drum and agitator are at a standstill then the valve 84 is opened to drain the grease and solvent out of the drum 10.

The rim 11 of the drum is provided near its ends with wheels 90 and 91 resting on supporting pulleys 92 and 93 journaled in suitable standards 94, 95. By the arrangement described the weight of the drum 10 is carried by the rollers 92, 93 thus relieving the hubs 21 and 22 of undue strain.

In order to rotate the drum 10 and the agitator in opposite directions use is made of the following arrangement: A main shaft 100 is journaled in suitable bearings 101, 102 mounted on a suitable base 103 and this shaft 100 is provided with a pulley 104 connected by belt with other machinery for imparting a rotary motion to the shaft 100. It is understood that other driving means may be employed for driving the said shaft 100. On the shaft 100 is secured a pinion 105 in mesh with a gear wheel 106 secured to or formed exteriorly on the rim 11 of the drum 10. Thus when the shaft 100 is rotated a rotary motion is given to the drum 10 in one direction. On the shaft 100 is secured a pinion 110 in mesh with an intermediate gear wheel 111 in mesh with a gear wheel 112 secured on the hub 22 thus rotating the latter and consequently the agitator within the drum 10 in a reverse direction to that given to the drum.

The operation is as follows:

The drum 10 is partly filled with a suitable amount of garbage or other organic matter by way of the opening 14 in uppermost position at the time and after the drum 10 is charged with the organic matter the cap is placed in position and fastened therein and then the main shaft 100 is started to rotate the drum 10 and the agitator 20 in opposite directions, as previously explained. At the same time steam is turned on to the pipes 36 and 37 to heat the rim 11 and the heads 12 and 13 of the drum and to heat the members of the agitator within the drum 10. Gasolene or other liquid is next passed through the pipe 60 and its discharge perforations 61 into the drum 10 and owing to the perforations the solvent is well distributed in the organic matter with which the drum is charged. It will be noticed that by heating the drum and agitator a heating of the organic matter as well as the solvent takes place to insure a quick reduction of the organic matter especially as the latter is continually and thoroughly agitated by revolving the drum 10 and the agitator in opposite directions. It is understood that the solvent quickly separates the fatty matter from the organic matter. The vapors arising during the reduction of the organic matter by the solvent, heat and agitator readily escape through the branch pipe 71 and the pipe 70, to be further treated if deemed necessary. It will be noticed that the organic matter eventually becomes dry and then the rotation of the drum and agitator is stopped, a fresh solvent is introduced, the material is thoroughly washed, and the grease and solvent is drained off from the drum 10 through the pipes 80, 81, 82 and 83 in lowermost position at the time.

Having thus described our invention, we claim as new and desire to secure by Letters Patent:—

1. An apparatus for extracting grease from organic matter, comprising a rotatable drum adapted to contain the organic matter, means for heating the drum and its contents, means for introducing a solvent into the drum, and means rotatable in opposite directions to the drum and arranged adjacent the wall of the drum for agitating the organic matter and the solvent while contained within the drum, said agitator serving as a heating medium.

2. An apparatus of the class described, comprising a drum, means for heating the drum, an agitator within the drum, said drum and agitator being rotatable in opposite directions and said agitator arranged adjacent the wall of the drum, and means for heating the agitator.

3. An apparatus of the class described, comprising a steam jacketed drum, a hollow agitator within the drum arranged adjacent the wall of the drum, means for supplying a heating medium to the said hollow agitator and means for operating the drum and agitator in opposite directions.

4. An apparatus for extracting grease from organic matter, comprising a revoluble drum adapted to be charged with organic matter, a revoluble agitator within the said drum, driving means for rotating the said drum and agitator in opposite directions, and a central feed pipe extending into the said drum and connected with a solvent supply to deliver a solvent to the drum and the material contained therein.

5. An apparatus for extracting grease from organic matter, comprising a revoluble drum adapted to be charged with organic matter, a revoluble agitator within the said drum and comprising a series of radial pipes and longitudinal pipes parallel to the axis of the drum, driving means for rotating the said drum and agitator in opposite directions, a central feed pipe extending into the said drum and connected with a solvent supply to deliver a solvent to the drum and the material contained therein, and means heating the said drum and the said agitator.

6. An apparatus for extracting grease from organic matter, comprising a revoluble drum adapted to be charged with organic matter, a revoluble agitator within the said drum, the said drum having a hollow rim and hollow heads forming steam chambers, the said agitator being formed of pipes arranged adjacent the wall of the drum substantially parallel to the axis and connected at their ends, a steam supply connected with the said steam chambers of the drum to heat the latter and connected with the said agitator pipes to heat the agitator, driving means for rotating the said drum and agitator in opposite directions, and a central feed pipe extending into the said drums and connected with a solvent supply to deliver a solvent to the drum and the material contained therein.

7. An apparatus for extracting grease from organic matter, comprising a revoluble drum adapted to be charged with organic matter, a revoluble agitator within the said drum comprising steam pipes arranged in spaced relation concentric to the circle of the drum, connectors for the end of said pipes, means for supplying a heating medium therethrough, driving means for rotating the said drum and agitator in opposite directions, a central feed pipe extending into the said drum and connected with a solvent supply to deliver a solvent to the drum and the material contained therein, and means carrying off the gases arising from the reduction of the organic matter by the heat and the solvent.

8. An apparatus for extracting grease from organic matter, comprising a revoluble drum having a hollow rim and hollow heads, the drum having a filling means for filling the drum with organic matter, an agitator of pipes arranged within the said drum and provided with hubs extending through the said drum heads and on which the latter are mounted to turn, a solvent supply pipe extending through one of the said hubs into the said drum to supply the latter with a solvent, a gas discharge pipe extending through the other hub and provided at its inner end with a hooded inlet, bearings for the outer ends of the said hubs and having steam supply chambers connected with the said hubs to heat the agitator with steam, steam supply pipes connecting the said hubs with the said drum rim and the drum heads to heat the drum with steam, means rotating the drum in one direction, and means rotating the agitator in an opposite direction.

9. An apparatus for extracting grease from organic matter, comprising a revoluble drum having a hollow rim and hollow heads, the drum having a filling means for filling the drum with organic matter, an agitator of pipes arranged within the said drum and provided with hubs extending through the said drum heads and on which the latter are mounted to turn, a solvent supply pipe extending through one of the said hubs into the said drum to supply the latter with a solvent, a gas discharge pipe extending through the other hub and provided at its inner end with a hooded inlet, bearings for the outer ends of the said hubs and having steam supply chambers connected with the said hubs to heat the agitator with steam, steam supply pipes connecting the said hubs with the said drum rim and the drum heads to heat the drum with steam, means rotating the drum in one direction, means rotating the agitator in an opposite direction, and means for drawing off the grease and solvent from the drum.

KARL A. STAHLGREN.
T. L. SHANNON.